Figure 1:
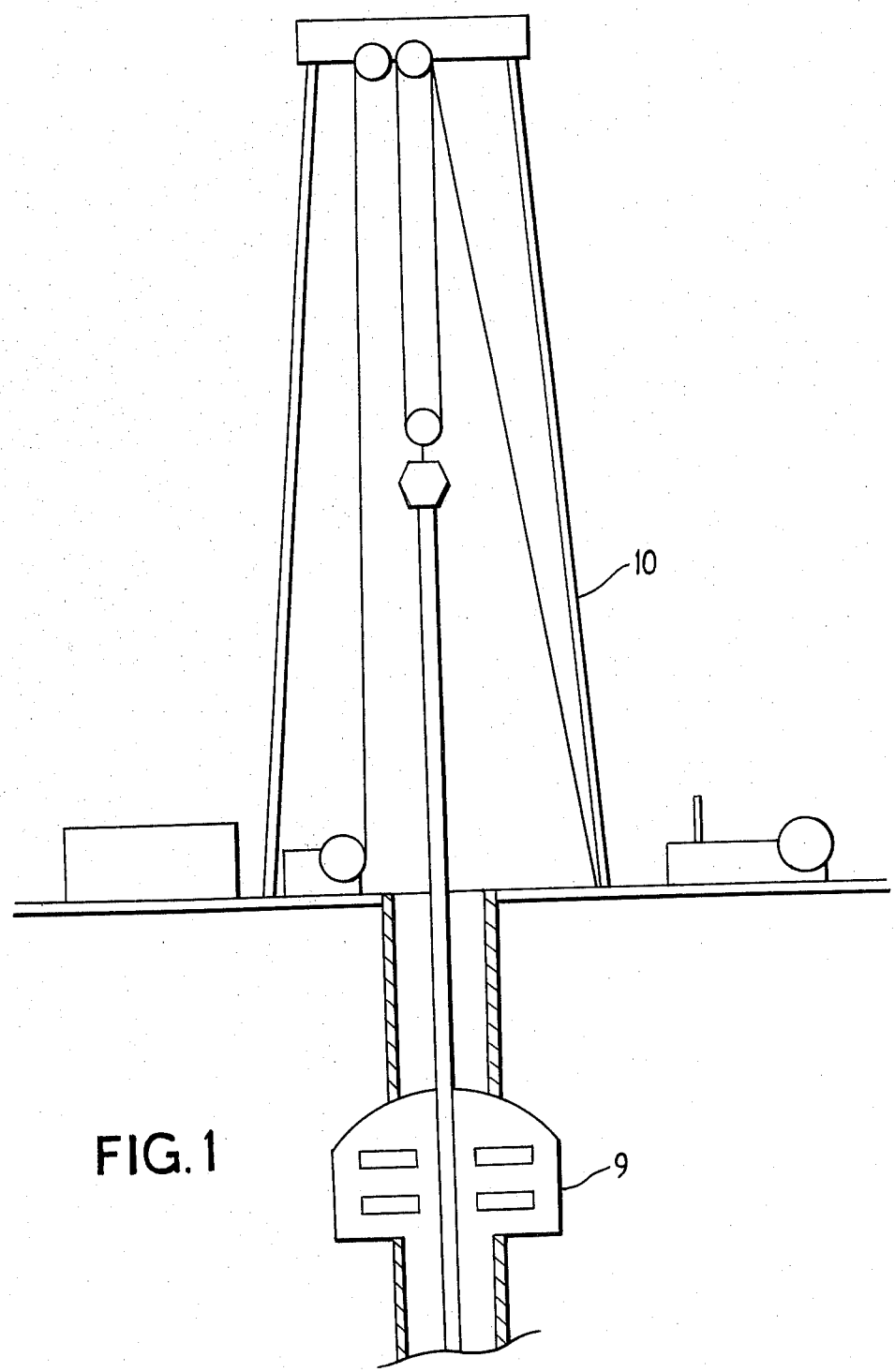

United States Patent [19]

Seabourn et al.

[11] 4,290,759

[45] Sep. 22, 1981

[54] APPARATUS FOR TEACHING PRESSURE CONTROL IN OIL AND GAS DRILLING OPERATIONS

[75] Inventors: Ed. O. Seabourn, Hinna, Norway; Lewis W. Patterson; Richard G. Stiverson, both of Lafayette, La.

[73] Assignee: Saga Petroleum A.S. & Co., Stavanger, Norway

[21] Appl. No.: 68,332

[22] Filed: Nov. 7, 1979

[30] Foreign Application Priority Data

Aug. 23, 1978 [NO] Norway ............................ 782860

[51] Int. Cl.³ .................................... G09B 25/00
[52] U.S. Cl. ........................................... 434/370
[58] Field of Search .................. 35/10, 49, 50, 51, 52, 35/53; 434/365, 370, 390

[56] References Cited

U.S. PATENT DOCUMENTS 1,954,561  4/1934  Cygon ............................ 35/51

Primary Examiner—Anton O. Oechsle
Attorney, Agent, or Firm—McAulay, Fields, Fisher, Goldstein & Nissen

[57] ABSTRACT

A training apparatus by which situations liable to occur during drilling for oil and gas, such as a blow out, may be simulated to teach better control thereof. The apparatus comprises a miniature drilling rig, a transparent bore hole casing imitation and a pressurized oil/gas reservoir imitation sealed from the casing by an easily through-drilled plug in the lower end of the casing.

9 Claims, 3 Drawing Figures

APPARATUS FOR TEACHING PRESSURE CONTROL IN OIL AND GAS DRILLING OPERATIONS

Ever since the drilling for oil and gas started in the last century, one of the most serious problems to be handled by the oil industry has been overpressure in the formations drilled. Overpressure caused the petroleum fluid to flow out of the well bore and resulted in an uncontrolled blow out in cases where no method was available to prevent this. And in the beginning no such methods were available; the oil was allowed to discharge freely until no more pressure was left.

Then one started to consider methods to prevent the oil from flowing freely and valves were constructed to this end.

Then another problem had to be considered: How to tackle the situation in which an overpressure was encountered and the valves were closed with a pressure underneath. Methods were then developed to pump into the well bore drilling fluid having a density sufficiently high to give a hydrostatic pressure exceeding the formation pressure, and by this means the latter was controlled. Several methods have been developed for this purpose and they have been improved in the course of time.

All this was based on experience from the field, and then one conceived the idea of training or teaching the operators before such a situation was encountered in the field. And this was the beginning of the first well pressure control schools. The initial theoretical teaching was based on earlier experience, and later on simulators were built to assist in the teaching. These prior simulators have control panels somewhat similar to the control panels of a drilling rig. A such simulator is able to show the students what happens on the surface. It can also show the students what is to be done in a situation with pressure on the well head.

The present invention aims at showing the students what is going on on the surface as well as downhole.

According to the present invention there is provided an apparatus for teaching pressure control in drilling for oil and gas, comprising a complete miniature drilling rig, casing and reservoir, said reservoir including a container filled with particulate material and being provided with means for controlled supply of pressurized gas, said casing including a transparent tube communicating with the reservoir through a screen, a plug replaceably located in the lower part of the casing and adapted to be penetrated by a drilling bit at the end of a drilling pipe being lowered from the miniature drilling rig, whereby the gas pressure in the reservoir is transmitted to the casing, and a miniature blow out preventer stack located in the upper part of the casing.

Figure 2:
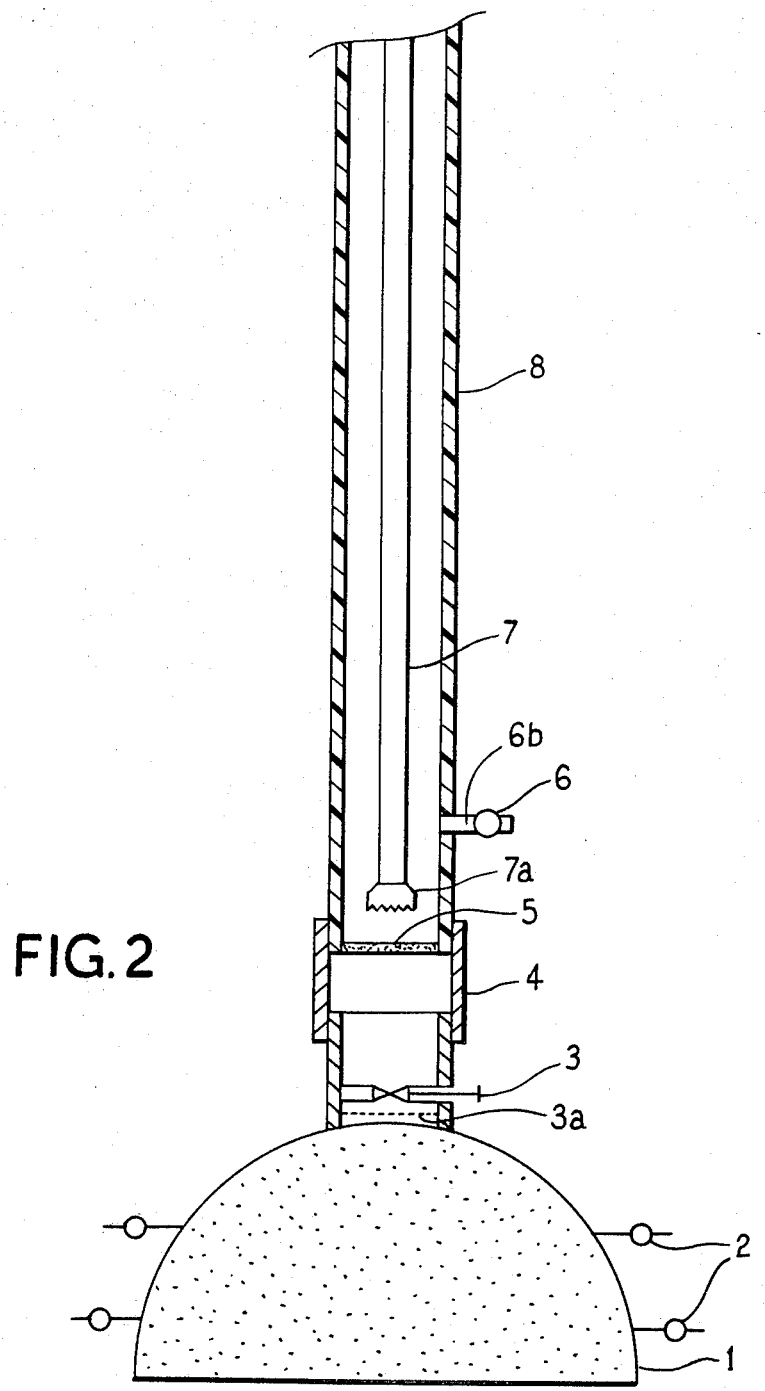
Figure 3:
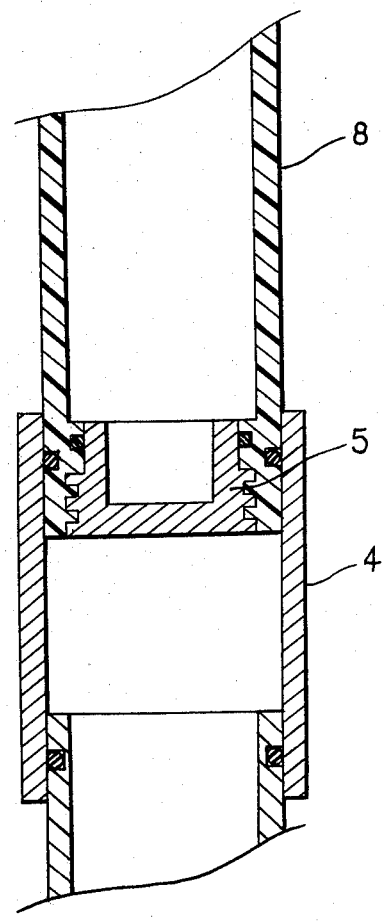

The invention will be more readily understood from a study of the following detailed description together with the accompanying drawings in which FIGS. 1 and 2 schematically illustrate the upper and lower part of the apparatus respectively, while FIG. 3 is a fragmental sectional elevation of the latter.

The reservoir 1 can be made from plastics and may contain a particulate material, e.g. volcanic ash imitating the porous and permeable formation. Various valves 2 may also be connected to the reservoir 1 so that pressurized gas, for example helium, may be pumped into the formation. To the reservoir 1 is connected a casing 8 made from a transparent material, preferably a plastics material. A screen 3a may be inserted at the lower part of the casing 8, to prevent ash from entering the interior of the casing 8, i.e. the bore hole. An adjustable valve 3 may be located above the screen 3a for controlling the amount of gas to be discharged into the hole. Above this valve a replaceable and easily drilled plug 5 is located, for example in the form of a disc of lead sealingly threaded into the casing 8. The disc may be easily replaced, for instance by means of a sealed sliding collar 4, such as best shown in FIG. 3. The plug or disc 5 may have a central recess acting as a guide for drilling bit 7a and providing the disc with a thickness suited for drilling through. Above the disc 5 there is mounted a valve 6 incorporating a screen 6b. The uppermost part of the casing 8 is provided with a stack of miniature blow out preventers 9 (FIG. 1). Drill pipe 7, which conveniently may be formed from transparent plastics similar to the casing 8, is then lowered from the drilling rig 10, a miniature drilling bit 7a being mounted at the lower end of the drill pipe. Gas, such as helium is then pumped into the reservoir until the pressure slightly exceeds the hydrostatic pressure acting in the bore hole which beforehand has been filled with water. When drilling through the disc 5, gas will enter into the bore hole and a kick-situation like that of an actual drilling rig will occur. Pressure gauges (not shown) are mounted for continuous read out of the pressure in the reservoir 1, and in the casing 8 above and below the disc 5. Owing to the small pressures that are present, all pressure gauges have to be very sensitive in order to record even minor variations in pressure. They should also be upcalibrated to show such pressures which are normal for a drilling rig.

When the disc 5 has been penetrated by the drilling bit 7a and gas has entered the hole, the discharge valve 3 is closed and the required calculations are made. Heavier drilling fluid is them pumped into the casing or drilling hole 8 in order to stabilize the pressure. This fluid will have a colour different from the water occupying the casing, so that the students all the time can see where the new fluid is located in the hole.

The apparatus may also be used to simulate lost circulation. By opening the valve 6, drilling fluid will be lost from the hole. The screen 6b in the valve 6 will then be clogged in a similar manner as in a lost circulation zone.

The apparatus may also be used to demonstrate other operations such as fishing, core drilling and testing.

The invention will be of great assistance in teaching personnel within the oil industry. By means of this apparatus the students are able to see what happens on the surface as well as downhole. In this way the personnel of the oil industry will be better trained and achieve a better understanding of what is going on and what should be done in a dangerous situation.

What we claim:

1. An apparatus for teaching pressure control in drilling for oil and gas, comprising
    a complete miniature drilling rig,
    a drilling pipe connected at one end thereof with said drilling rig,
    a drilling bit connected with the other end of said drilling pipe,
    a casing and a reservoir,
    said reservoir including a container filled with particulate material and being provided with means for controlling the supply of pressurized gas, said casing including a transparent tube communicating with said reservoir through a screen, a plug replaceably located in the lower part of said casing and adapted to be penetrated by said drilling bit when said drilling pipe is lowered from said miniature drilling rig, whereby the gas pressure in said reservoir is transmitted to said casing, and a miniature blow out preventer stack located in the upper part of said casing.

2. An apparatus according to claim 1 wherein the reservoir is filled with volcanic ash.

3. An apparatus according to claim 1 wherein the plug is in the form of a disc of lead.

4. An apparatus according to claim 1 wherein a valve is located in the casing between the plug and the reservoir, for controlling the pressure in the casing when the plug is penetrated.

5. An apparatus according to claim 1 wherein a discharge valve is located in the wall of the casing below the blow out preventer stack to enable simulating lost circulation.

6. An apparatus according to claim 1 wherein the casing and the drilling pipe are made from a transparent material such as plastics.

7. An apparatus according to claim 5, wherein a screen is positioned between said discharge valve and the interior of said casing, said screen becoming clogged during simulation of the lost circulation.

8. An apparatus according to claim 1, wherein said plug is in the form of a sealed sliding collar.

9. An apparatus according to claim 3 or 8 wherein said plug has a central recess for guiding said drilling bit.

* * * * *